(12) United States Patent
Lee et al.

(10) Patent No.: US 7,853,091 B2
(45) Date of Patent: Dec. 14, 2010

(54) MOTION VECTOR OPERATION DEVICES AND METHODS INCLUDING PREDICTION

(75) Inventors: Yong-Mi Lee, Gyeonggi-do (KR); Deuk-Soo Jung, Seoul (KR); Chang-Young Jung, Seoul (KR); Jung-Sun Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1498 days.

(21) Appl. No.: 11/220,752

(22) Filed: Sep. 7, 2005

(65) Prior Publication Data

US 2006/0140275 A1     Jun. 29, 2006

(30) Foreign Application Priority Data

Dec. 9, 2004 (KR) .................... 10-2004-0103717

(51) Int. Cl.
*G06K 9/36* (2006.01)
*G06K 9/46* (2006.01)

(52) U.S. Cl. ..................................... 382/236

(58) Field of Classification Search ............... 382/232, 382/233, 236, 238, 253, 268, 305; 375/240.01, 375/240.16, 240.24, 240.27, 240.29, E7.1, 375/E7.093, E7.094, E7.102, E7.105; 348/413.1, 348/699, 714, 715, 718, 719
See application file for complete search history.

(56) References Cited

U.S. PATENT DOCUMENTS

| | | | | |
|---|---|---|---|---|
| 5,357,287 A * | 10/1994 | Koo et al. | .................... | 348/699 |
| 5,448,310 A * | 9/1995 | Kopet et al. | .................. | 348/699 |
| 5,742,814 A * | 4/1998 | Balasa et al. | ........................ | 1/1 |
| 6,301,299 B1 * | 10/2001 | Sita et al. | ................ | 375/240.01 |
| 6,421,385 B1 | 7/2002 | Uenoyama et al. | | |
| 6,552,749 B1 * | 4/2003 | Jones et al. | .................. | 348/441 |
| 6,674,798 B2 * | 1/2004 | Ishihara et al. | ......... | 375/240.16 |
| 7,035,470 B2 * | 4/2006 | Wong et al. | .................. | 382/233 |
| 7,236,634 B2 * | 6/2007 | Miyakoshi et al. | .......... | 382/236 |
| 2001/0031004 A1 * | 10/2001 | Kim et al. | ............... | 375/240.16 |
| 2006/0140275 A1 * | 6/2006 | Lee et al. | ............... | 375/240.16 |
| 2008/0043853 A1 * | 2/2008 | Kawa | ..................... | 375/240.29 |

FOREIGN PATENT DOCUMENTS

| | | |
|---|---|---|
| JP | 11-112973 A | 4/1999 |
| JP | 2004-187107 A | 7/2004 |
| KR | 2001-0082933 A | 8/2001 |

\* cited by examiner

*Primary Examiner*—Amir Alavi
(74) *Attorney, Agent, or Firm*—Myers Bigel Sibley & Sajovec, P.A.

(57) ABSTRACT

A motion-vector operation device includes an upper memory composed of first and second banks that store motion vectors of a lower block group belonging to a macroblock, a left memory storing motion vectors of a right block group belonging to a macroblock, and an estimator predicting a motion vector of a current block with reference to the motion vectors stored in the first and second banks of the upper memory and the left memory in accordance with an operation mode and a position of the current block in a super macroblock.

53 Claims, 15 Drawing Sheets

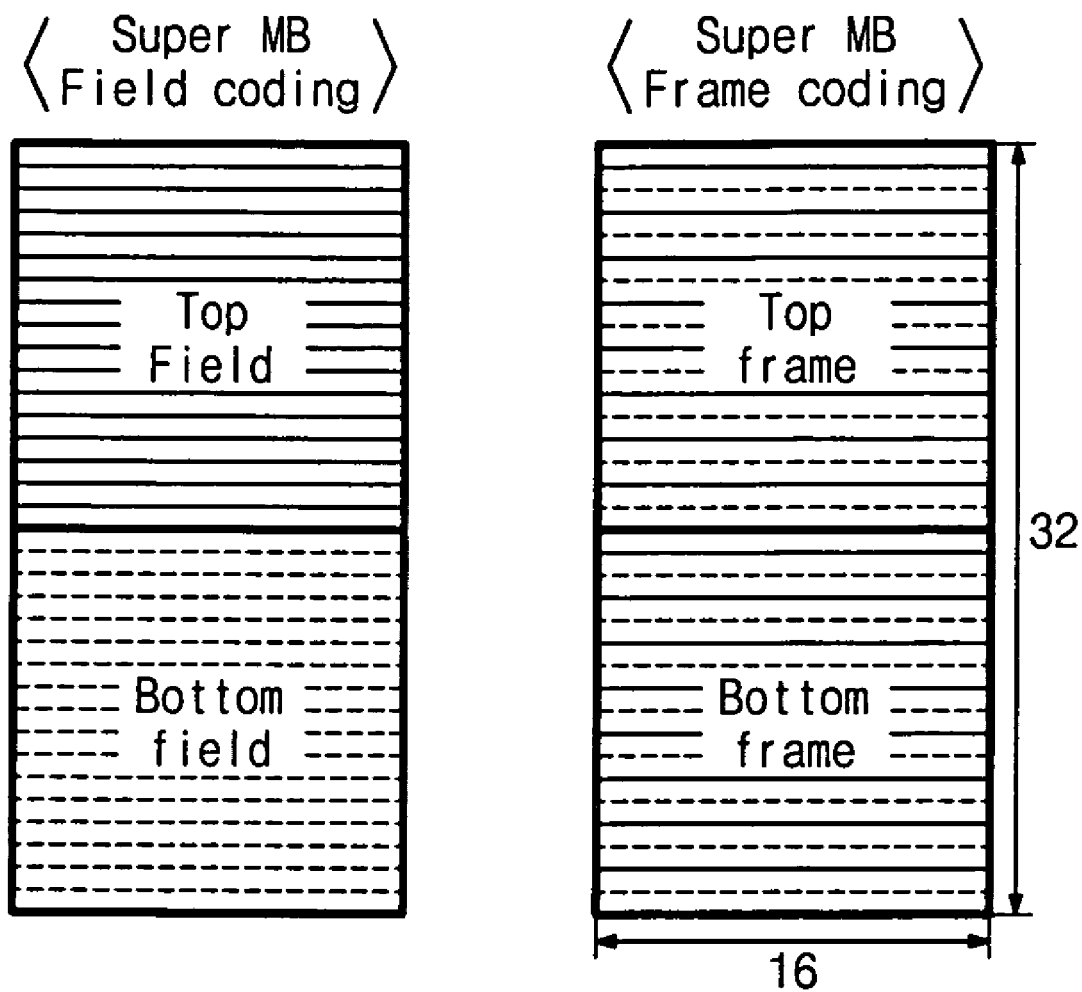

MOTION VECTOR OPERATION DEVICES AND METHODS INCLUDING PREDICTION

CROSS-REFERENCE TO RELATED APPLICATION

This application claims the benefit under 35 USC §119 of Korean Patent Application No. 2004-0103717 filed on Dec. 9, 2004, the disclosure of which is hereby incorporated herein by reference in its entirety as if set forth fully herein.

FIELD OF THE INVENTION

The present invention is concerned with image processing apparatus and methods, and more particular to motion-vector operation devices and methods.

BACKGROUND OF THE INVENTION

Compressed encoding and decoding technologies for motion-picture signals are used in a variety of applications such as storage, transmission, and so forth, because they can reduce a memory space for storing data of the motion picture information, and can enable the motion picture to be transferred through even a low rate channel. Standards have been proposed for compressing the picture information and for processing motion pictures.

For motion picture processing, the International Telecommunication Union-Telecommunication Standard Sectors (ITU-T) formulated the H.261 and H.263 standards for motion picture service in the environment of wired or wireless communication networks, and the International Standardization Organization (ISO) established the standards of Moving Picture Expert Group (MPEG-1, MPEG-2, and MPEG-4). After the developments of H.263+ and MPEG-4, the rapid spreading of radio (or wireless) communication may provide impetus for reliable standards for motion-picture compression technologies, which can be adapted to various environments of communication and can provide improved compression efficiency. Thus, ITU-T published a "Request for technical proposal" that was given in the name of H.26L as a new-generation coding method, from which many studies have been made by many companies, institutes, and academies. Since the H.26L project in 2001, ITU-T approved the standard of H.264 in May of 2003 and finally approved MPEG-4 Part 10 at ISO/IEC in August of 2003.

The standard H.264 for a new-generation motion-picture compression, being established commonly by ITU-T and ISO, has been improved from the former standards such as MPEG-2 or MPEG-4 (Part 2) in view of the flexibility to adapt to various network environments and the efficiency for encoding motion picture data. According to some appraisals by engineers, a data compression rate by H.264 may be two or three times that of MPEG-2 used in a DVD system and more than 50% or two times that of MPEG-4. With the new technology, it is possible to obtain image quality comparable to a DVD level at the coding rate about 2 Mbps, or comparable to a home VCR level at 1 Mbps.

Applying the technique of H.264 to the practical field of product and service, it may be effective in reducing capacity for image data, which can raise a data transmission rate. And, while MPEG-2 is employed in digital broadcasting systems and MPEG-4 is frequently employed with image transmission by mobile phones, H.264 may be applied first to applications that desire high compression rates.

In a conventional method of coding a motion picture, motion estimation and compensation is performed in the unit of pixel group (M×N) that is formed of M pixels along the horizontal direction and N pixels along the vertical direction, instead of performing the motion estimation and compensation over the whole picture frame. Such a pixel group is referred to as macroblock. A unit size of the macroblock may be defined as being composed of 16 vertical pixels by 16 horizontal pixels (16×16) in a general motion-picture coding scheme.

Meanwhile, the motion estimation and compensation by the new-generation motion-picture coding technique, such as H.264/AVC or MPEG-4 Part 10, may be carried out in the unit of a smaller pixel group. A macroblock mode type is selected in the range of 16×16, 16×8, 8×16, and 8×8, and then the 8×8 mode is classified into subsidiary mode types 8×4, 4×8, and 4×4. Therefore, when blocks of one macroblock are all sized in the unit of 4×4, a motion vector is ranged up to 16 at maximum and the motion estimation and estimation may be performed by each block.

FIG. 1 illustrates a motion vector for a current block E, positions of peripheral blocks A, B, C, and D used in estimating the motion vector of the current block E, and motion vectors for the blocks A~D. The motion vector of the current block E is obtained by utilizing the motion vectors of its peripheral blocks A, B, and C (or D).

In the description hereinafter, the peripheral blocks A, B, C, and D are positioned around the current block E as shown in FIG. 1. The motion vectors of the current block E and the peripheral blocks A, B, C, and D are denoted to MV_E, MV_A, MV_B, MV_C, and MV_D, respectively.

The motion vector of the peripheral block, which is used in estimating the motion vector MV_E of the current block E, is a motion vector of a block within a peripheral macroblock or a motion vector of a block within a current macroblock in accordance with a position of the current block.

FIGS. 2A through 2C illustrate variation in positions in accordance with mode types and positions of the current block. FIG. 2A shows configuration of the peripheral blocks A~D used in estimating a motion vector when the current block E is set with 16×16. The motion vectors of the peripheral blocks A~D are used with motion vectors of blocks included in a peripheral macroblock. FIGS. 2B and 2C illustrate the case that the current macroblock is established in 16×8 mode, the macroblock being divided into small pixel groups E0 and E1. The motion vectors of the peripheral blocks A~D around the block E0 are used with motion vectors of blocks within a peripheral macroblock as the 16×16 mode. Also, the motion vectors of the peripheral blocks A and D around the block E1 are used with motion vectors of blocks within a peripheral macroblock as the 16×16 mode. But, the motion vector of the peripheral block B around the block E1 is used with a motion vector that is calculated in the block E0 of the current macroblock, different from the cases for the other peripheral blocks.

Further, if the peripheral block C is positioned out of a slice (a group of blocks in a row along the horizontal direction) that is being processed in coding at present or is a block of a macroblock to be coded next to the current macroblock, the peripheral motion vector MV_D instead of MV_C may be used for estimating the current motion vector MV_E together with the peripheral motion vectors MV_A and MV_B.

As such, since it uses the motion vectors of the peripheral blocks A~D, MV_A~MV_D, in estimating the motion vector MV_E of the current block E, the motion vectors of blocks within the macroblock previously coded before the current macroblock should be stored in a memory.

Moreover, an H.264/AVC codec was established in a macroblock adaptive frame/field (MBAFF) mode to enhance coding efficiency. FIG. 3A illustrates an example of the MBAFF mode coding a vertical macroblock pair that is referred to as a single super macroblock. In this description, such a macroblock pair in the vertical direction (or column) is referred to as a super macroblock. The macroblock is coded in the frame or field mode when it is not in the MBAFF mode, while the macroblock is able to be coded with a mixed version of the frame and field modes when it is in the MBAFF mode. In general, the normal mode is referred to as one of the frame and normal modes.

FIG. 3B illustrates a super macroblock in a normal mode. In the MBAFF mode shown in FIG. 3A, while a pair of the macroblocks is referred to as a super macroblock, the normal mode regards a single macroblock as a super macroblock.

FIG. 4 comparatively illustrates the cases of coding the super macroblock into the field and frame modes. When macroblocks of the super macroblock are coded into the field mode, the top macroblock of the super macroblock is composed only of odd-numbered pixel lines while the bottom macroblock of the super macroblock is composed only of even-numbered pixel lines. Otherwise, when macroblocks of the super macroblock are coded into the frame mode, the top and bottom macroblocks of the super macroblock are composed without differentiating odd- and even-numbered pixel lines.

In the case of a mixed condition with super macroblocks coded in the field and frame modes in a single picture frame, there may be deformations of the peripheral blocks in accordance with the coded condition of the current and peripheral macroblocks by the field or frame mode and thereby a complicated indexing process may be conducted for obtaining the motion vector MV_E of the current block E. In other words, locations of the peripheral blocks A~D to estimate the motion vector of the current block E may be variable in accordance with whether the current and peripheral macroblocks have been coded in the frame or field mode and whether the current macroblock is positioned on the top or bottom.

FIGS. 5A through 5C illustrate features of the motion vector MV_A of the left block in accordance with coding modes of the current and peripheral macroblocks. If the current and left macroblocks have been all coded into the frame or field mode, the motion vector MV_A of the left block for the current block E is determined by the pattern shown in FIG. 5A. In other words, the motion vector positioned at the location, to which the arrow designates, is the motion vector MV_A of the left block for the current block E.

Provided that coding modes of the current and left macroblocks are different from each other, i.e., if the current macroblock has been coded in the frame mode while the left macroblock has been coded in the field mode, or the reverse, the motion vector MV_A of the left block is determined after passing through a complicated indexing procedure in accordance with the position of the current block E as shown in FIGS. 5A and 5C.

FIGS. 6A through 6C illustrate a motion vector position of the top block in accordance with coding modes of the current and peripheral macroblocks. In FIGS. 6A through 6C, the top and bottom macroblocks of a current super macroblock are each represented as E_top and E_bottom while the top and bottom macroblocks of an upper super macroblock are each represented as B_top and B_bottom.

As shown in FIG. 6A, if the current super macroblock has been coded in the frame mode, the upper motion vector MV_B of the top macroblock E_top of the current super macroblock is determined by motion vectors of blocks included in the bottom macroblock B_bottom regardless of a coding mode type of the upper super macroblock, while the upper motion vector MV_B of the bottom macroblock B_top of the current super macroblock is determined by motion vectors of blocks included in the top macroblock T_bottom of the current super macroblock.

As shown in FIG. 6B, if the current and upper super macroblocks have been coded in the field mode, the upper motion vector MV_B of the top macroblock E_top of the current super macroblock is determined by motion vectors of blocks included in the top macroblock B_top, while the upper motion vector MV_B of the bottom macroblock E_bottom of the current super macroblock is determined by motion vectors of blocks included in the bottom macroblock B_bottom of the upper super macroblock.

As shown in FIG. 6C, if the current and upper super macroblocks have been coded in the field and frame modes, respectively, the upper motion vectors MV_B of the top and bottom macroblocks E_top and E_bottom of the current super macroblock are determined by motion vectors of blocks included in the bottom macroblock B_bottom of the upper super macroblock.

As well as the upper motion vectors MV_B, the upper left and right motion vectors, MV_C and MV_D, are also selected by the manner as illustrated in FIGS. 6A through 6C, and it is possible to obtain motion vectors of blocks included in the current macroblock by means of the motion vectors MV_A, MV_B, and MV_C (or MV_D).

The motion vector estimation may be performed so as to efficiently code a motion vector by utilizing the fact that characteristics between adjacent motion vectors are generally similar to each other. However, additional memory to store the peripheral motion vectors may be needed, because it refers to the peripheral vectors of blocks included in the peripheral macroblock. Furthermore, in the case of assisting the MBAFF mode, as the motion vectors of the peripheral blocks are distributed in various ranges, a size of the additional memory may become larger. In addition, a complicated indexing procedure for finding the motion vectors of the peripheral blocks may also be needed to estimate the motion vector of the current macroblock in accordance with the coding mode type that is the field or frame mode, or in accordance with whether the macroblock is positioned at the top or the bottom. Therefore, the memory size may become larger and the indexing procedure may become complicated, in independently storing motion vectors of all the macroblocks corresponding to one picture frame or in storing all vectors corresponding to one slice.

SUMMARY OF THE INVENTION

Some embodiments of the invention can provide a motion-vector operation device that includes an upper memory comprising first and second banks that are configured to store motion vectors of a lower block group belonging to a macroblock. A left memory is configured to store motion vectors of a right block group belonging to a macroblock. An estimator is configured to predict a motion vector of a current block with reference to the motion vectors stored in the first and second banks of the upper memory and the left memory in accordance with an operation mode and a position of the current block in a super macroblock.

In some embodiments, the device further comprises an adder that is configured to output a motion vector in response to adding a difference between the estimated motion vector and motion vector of the current block.

In some embodiments, the estimator comprises a register that is configured to store the motion vector output from the adder for a block of the current super macroblock.

In some embodiments, the motion-vector operation device is operable in a macroblock adaptive frame/field (MBAFF) mode.

In some embodiments, the motion-vector operation device in the MBAFF mode can include one or more of the following embodiments:

The super macroblock includes first and second macroblocks. The first and second macroblocks are adjacent to each other along a horizontal direction, forming a macroblock pair.

The estimator is configured to control the motion vector of the adder to be stored in the first bank of the upper memory when the current block belongs to the first macroblock.

The estimator also is configured to control the motion vector of the adder to be stored in the second bank of the upper memory when the current block belongs to the second macroblock.

A size of the first and second banks of the upper memory is $(w*a+1)*s$, where w is the number of macroblocks on a horizontal direction in a frame; a is the number of blocks on the horizontal direction in a macroblock; and s is a size of motion vector.

The first bank of the upper memory is configured to store motion vectors from the last block of the bottom block group, belonging to the first macroblock of a left-upper super macroblock around the super macroblock, to the bottom block group belonging to the first macroblock of a left super macroblock around the super macroblock.

The second bank of the upper memory is also configured to store motion vectors from the last block of the bottom block group, belonging to the second macroblock of a left-upper super macroblock around the super macroblock, to the bottom block group belonging to the second macroblock of a left super macroblock around the super macroblock.

The left-upper super macroblock is adjacent to the super macroblock left and upwardly. The left super macroblock is adjacent left to the super macroblock.

The estimator is configured to generate an address containing a start address, a bank address, and an offset address, accessing the upper memory.

The start address increases every super macroblock and by the number of blocks included in the bottom block group of the macroblock. The start address is re-established in a value of (start address−bank size) when the start address is larger than the bank size.

The bank address is provided to select the first and second banks of the upper memory.

The offset address is established in accordance with a size of the block belonging to the macroblock and a position of a peripheral block.

The address is a sum of the start address, the bank address, and the offset address.

The estimator is configured to control the motion vector of the adder to be stored in a position of the upper memory designated by the address.

The left memory stores motion vectors of the right block group of the left super macroblock around the super macroblock.

In some embodiments, the motion-vector operation device is operable in a normal mode. In some embodiments, the motion-vector operation device in the normal mode can include one or more of the following embodiments:

The super macroblock includes a first macroblock.

The estimator is configured to predict a motion vector of a current block of the super macroblock with reference to motion vectors stored in the first bank of the upper memory and the left memory and motion vectors of the super macroblock preliminarily obtained.

The estimator also is configured to control the motion vector of the adder to be stored in the first bank of the upper memory.

Other embodiments of the invention provide methods of operating a motion vector in a device comprising an upper memory including first and second banks, a left memory, and a register that is configured to store a motion vector of a current super macroblock. These methods comprise calculating a motion vector of a current block with reference to motion vectors stored in the first and second banks of the upper memory, the left memory, and the register in accordance with an operation mode and a position of the current block in the current super macroblock, and storing the motion vector in the first and second banks of the upper memory or the left memory in accordance with the operation mode and the position of the current block in the current super macroblock.

In some embodiments, calculating the motion vector comprises estimating a motion vector of the current block with reference to motion vectors stored in the upper and left memories and motion vectors of the super macroblock preliminarily obtained, and outputting the motion vector of the current block from adding a difference between the estimated motion vector and motion vector of the current block.

In some embodiments, the methods are operable in a macroblock adaptive frame/field (MBAFF) mode. The methods of operating the motion vector in the MBAFF mode may include one or more of the following embodiments:

The super macroblock includes first and second macroblocks. The first and second macroblocks are adjacent to each other along a horizontal direction, forming a macroblock pair.

The storing of the motion vector may comprise storing the calculated motion vector of the current block in the first bank of the upper memory when the current block belongs to the bottom block group of the first macroblock of the super macroblock, and storing the calculated motion vector of the current block in the second bank of the upper memory when the current block belongs to the bottom block group of the second macroblock of the super macroblock.

The storing of the motion vector may also comprise storing the motion vector of the current block in the left memory when the current block belongs to the left block group of the macroblock.

A size of the first and second banks of the upper memory is $(w*a+1)*s$, where w is the number of macroblocks on a horizontal direction in a frame; a is the number of blocks on the horizontal direction in a macroblock; and s is a size of motion vector.

The methods may further comprise generating an address to access the upper memory.

The address contains a start address, a bank address, and an offset address. The bank address is provided to select the first and second banks of the upper memory. The start address increases every macroblock and by the number of blocks included in the bottom block group of the macroblock. The start address is re-established in a value of (start address−bank size) when the start address is larger than the bank size. The offset address is established in accordance with a size of the block belonging to the macroblock. The address is a sum of the start address, the bank address, and the offset address.

Estimating the motion vector may comprise reading motion vectors of the top and right-upper blocks from the upper memory and taking the read motion vectors as upper and right-upper motion vectors respectively, when the right-upper block of the current block is valid and the current block belongs to the top block group of the first macroblock.

Estimating the motion vector may further comprise reading motion vectors of the top and right-upper blocks from the register and taking the read motion vectors as upper and right-upper motion vectors respectively, when the right-upper block of the current block is valid and the current block belongs to the top block group of the first macroblock.

Estimating the motion vector may further comprise reading motion vectors of the top and left-upper blocks from the upper memory and taking the read motion vectors as upper and left-upper motion vectors respectively, when the right-upper block of the current block is invalid and the current block belongs to the top block group of the first macroblock.

Estimating the motion vector may further comprise reading motion vectors of the top and left-upper blocks from the register and taking the read motion vectors as upper and left-upper motion vectors respectively, when the right-upper block of the current block is invalid and the current block belongs to the top block group of the first macroblock.

Estimating the motion vector may further comprise taking a motion vector of the left block, which is stored in the left memory, as a left motion vector when the current block is positioned at the left boundary of the macroblock.

Estimating the motion vector may further comprise taking a motion vector of the left block of the current super macroblock as the left motion vector when the current block is positioned out of the left boundary of the macroblock.

Estimating the motion vector may further comprise estimating the motion vector of the current block on basis of the upper motion vector, the left- and right upper motion vectors, and the left motion vector.

BRIEF DESCRIPTION OF THE DRAWINGS

FIG. 4 is a schematic diagram comparatively illustrating conventional cases of coding the super macroblock into field and frame modes;

DETAILED DESCRIPTION OF PREFERRED EMBODIMENTS

Figure 1:
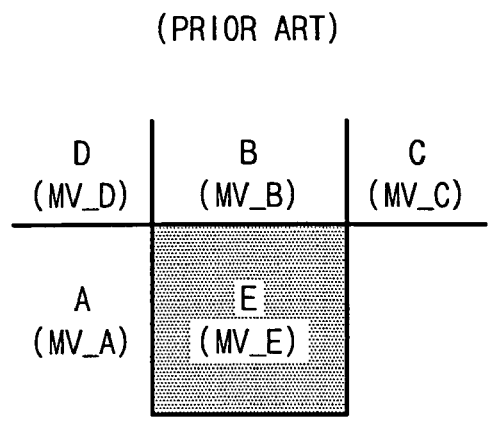
FIG. 1 is a schematic diagram illustrating a conventional motion vector for a current block E, positions of peripheral blocks A, B, C, and D used in estimating the motion vector of the current block E, and motion vectors for the blocks A~D.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising,"

"includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the flowcharts and/or block diagrams, and combinations of blocks in the flowcharts and/or block diagrams, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the flowcharts and/or block diagrams provides support for methods, computer program products and/or systems (structural and/or means-plus-function). Finally, the functionality of one or more blocks may be separated and/or combined with that of other blocks.

Furthermore, relative terms, such as "lower", "upper", "horizontal", "vertical", "left" and "right" may be used herein to describe one element's relationship to another element as illustrated in the Figures. It will be understood that relative terms are intended to encompass different orientations of the device in addition to the orientation depicted in the Figures.

Motion-vector estimation systems, methods and/or computer program products according to exemplary embodiments of the present invention are able to be used even in a normal mode, as well as in the MBAFF mode, and may be operable with a reduced or minimized memory in size, by allowing efficient constructing of the memory storing motion vectors of peripheral macroblocks. And, exemplary embodiments of the present invention can determine the motion vectors MV_A, MV_B, MV_C, and MV_D of the peripheral blocks stored in the memory in accordance with coding modes for the current and peripheral macroblocks, and can update the motion vectors of the peripheral macroblocks.

In order to estimate a motion vector of the current block, reference is made to motion vectors of blocks included in the peripheral macroblock, and motion vectors of the peripheral macroblocks are stored because the peripheral macroblocks have been already processed before the current macroblock.

Figure 7:
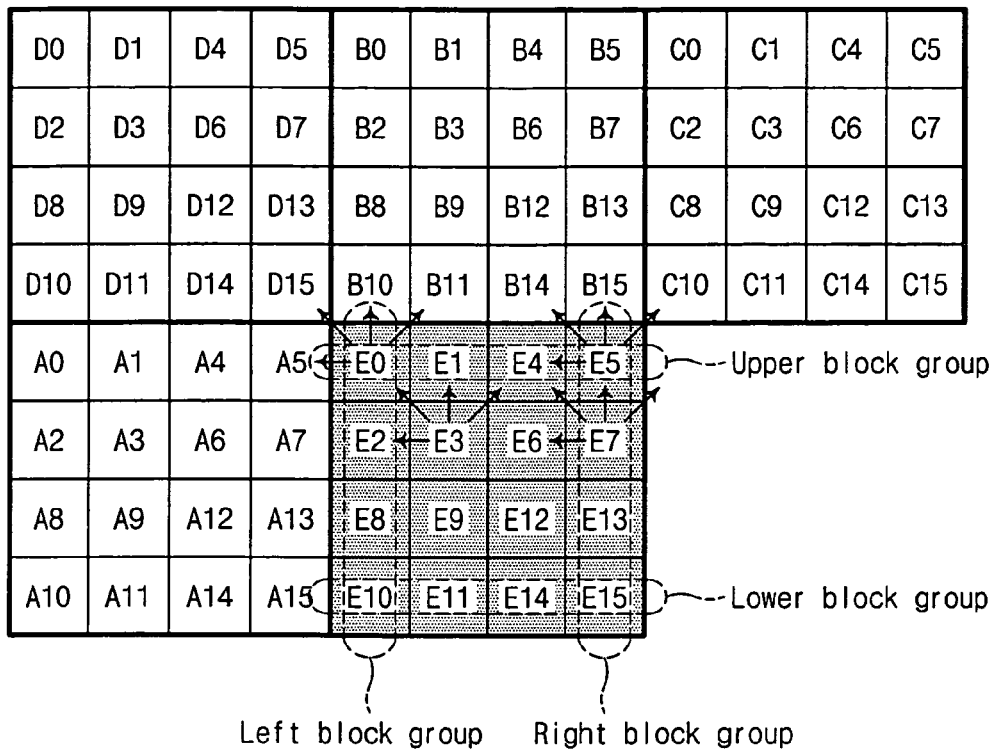
FIG. 7 is a schematic diagram illustrating dividing the current macroblock E and the peripheral macroblocks A, B, C, and D into sixteen 4×4 blocks, according to exemplary embodiments of the present invention.

FIG. 7 illustrates dividing the current macroblock E and the peripheral macroblocks A, B, C, and D into sixteen 4×4 blocks. If blocks of the current macroblock are segmented in the mode of 4×4 sections as the minimum size, 16 motion vectors as a whole may be estimated. Thus, a macroblock is being divided into four sections along the vertical and four sections along the horizontal, and motion vectors for the divided blocks are stored in a memory.

The memories storing motion vectors of the peripheral macroblocks are classified into a left memory storing the motion vector MV_A of blocks included in the left macroblock, and an upper memory storing the motion vectors MV_B, MV_D, and MV_C of blocks each included in the upper, left-upper, and right-upper macroblocks.

In estimating the left motion vector MV_A of the macroblock E, the motion vectors of the right blocks A5, A7, A13, and A15 included in the left macroblock A are used, the motion vectors being stored in the left memory. The upper memory stores motion vectors of the bottom blocks B10, B11, B14, and B15 of the upper macroblock B used for estimating the upper motion vector MV_B of the current macroblock E, a motion vector of a right-bottom block D15 of the left-upper macroblock D used for estimating the left-upper motion vector Mv_D of the current macroblock E, and a motion vector of a left-bottom block C10 of the right-upper macroblock E used for estimating the light-upper motion vector MV_C of the current macroblock E.

As an example, in estimating the motion vector of the current block E0, it uses the motion vector of the peripheral block A5 stored in the left memory, and the motion vectors of the peripheral blocks B10 and B11 (or D15) stored in the upper memory. In estimating the motion vector of the block E5, it uses the motion vectors of the peripheral blocks B15 and C19 (or B14) stored in the upper memory and the motion vector of the block E5 of the current macroblock. Otherwise, in obtaining the motion vector of the block E3, it uses only the motion vectors of the blocks E2, E1, and E4 (or E0) without referring to the left and upper memories. In estimating the motion vector of the block E7 that cannot be associated with its own right-upper block, the left-upper block E4 is considered to be used therein instead of right-upper block that is absent.

First, it will be described how the motion vectors are stored in the upper memory. The motion vectors of the blocks to be stored in the upper memory correspond to the upper, left-upper, and right-upper macroblocks of the current macroblock. A size of the upper memory is proportional to the number of macroblocks along the horizontal direction in the picture frame.

In the MBAFF mode, a complicated indexing process may be used for finding motion vectors of the peripheral blocks as aforementioned. For the purpose of simplifying the indexing procedure, exemplary embodiments of the present invention can provide configurations in which the upper memory is divided into two banks so as to independently store motion vectors of the upper and lower macroblocks around the super macroblock into the two banks.

Figure 8A:
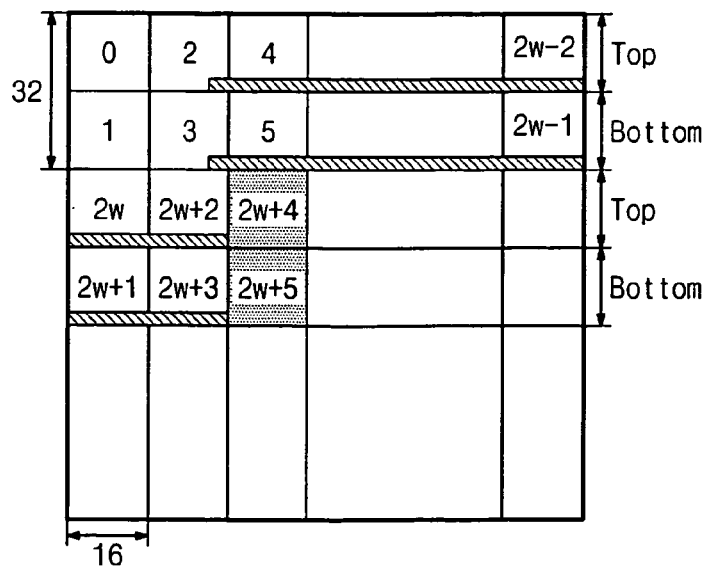
FIG. 8A is a schematic diagram illustrating peripheral blocks to be stored in the upper memory in the MBAFF mode, according to exemplary embodiments of the present invention.
Figure 8B:
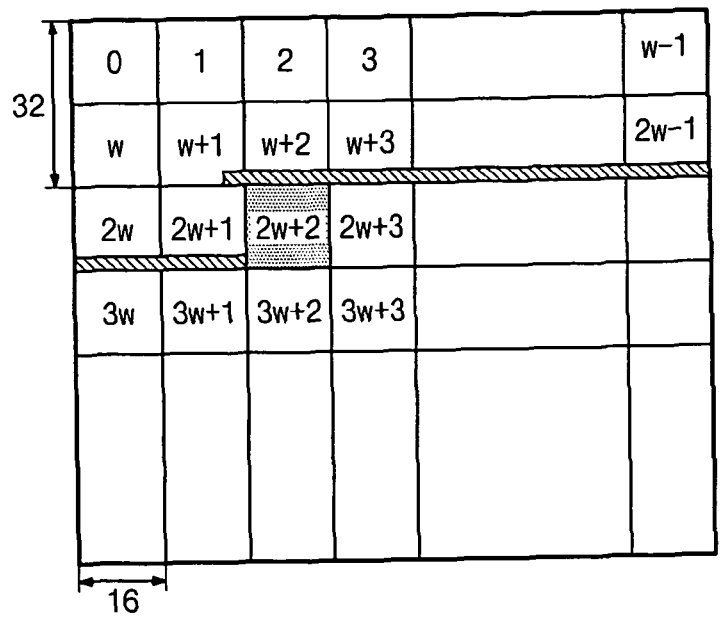
FIG. 8B is a schematic diagram illustrating peripheral blocks to be stored in the upper memory in the normal mode, according to exemplary embodiments of the present invention.
Figure 9:
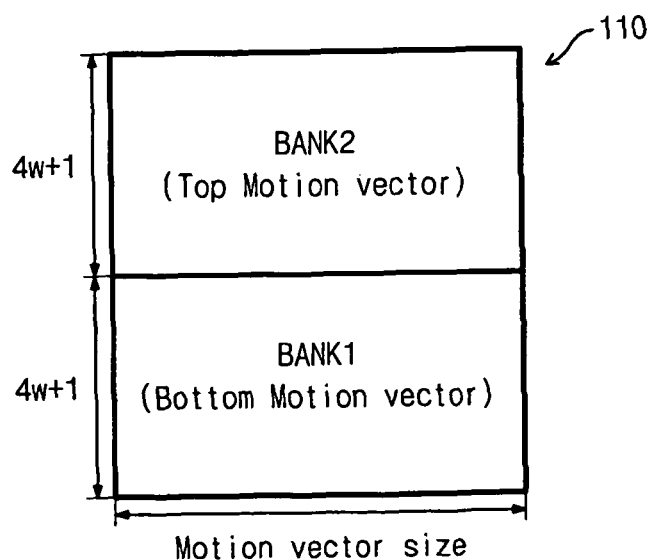
FIG. 9 is a schematic diagram illustrating a structure of an upper memory, according to exemplary embodiments of the present invention.

FIG. 8A is a schematic diagram illustrating peripheral blocks to be stored in the upper memory in the MBAFF mode, while FIG. 8B is a schematic diagram illustrating peripheral blocks to be stored in the upper memory in the normal mode. And, FIG. 9 is a schematic diagram illustrating a structure of the upper memory. In the MBAFF mode, motion vectors of blocks of the upper macroblock included in a super macroblock are stored in the second bank BANK2, while motion vectors of the lower macroblock are stored in the first bank BANK1. On the other hand, as a super macroblock in the normal mode includes a single macroblock, motion vectors of the super macroblock are stored all in the second bank BANK2.

As the upper memory 110 stores motion vectors of four blocks belonging to the bottom block group of one macroblock, it can be sized in proportion with the number of macroblocks on the horizontal direction in a picture frame. The following Equation 1 can define the minimum size of each bank of the upper memory, and Equation 2 can define the minimum size of the upper memory as a whole.

BankSize=(w*a+1)*s  [Equation 1]

MemorySize=BankSize*2  [Equation 2]

In Equation 1, the parameter s denotes the number of bits that represents a motion vector, the parameter w denotes the number of horizontal macroblocks in one frame, and the parameter a denotes the number of horizontal blocks in one macroblock. In this embodiment, a is 4 because one macroblock is composed of four blocks along the horizontal direction (or on a row). The MemorySize is multiplied from the number of w*4+1.

For instance, in FIG. 8A, the motion vectors stored in the upper memory 110, for estimating motion vectors of current (2w+4)'th and (2w+5)'th macroblocks, correspond to those of the hatched blocks. And, in FIG. 8B, the motion vectors stored in the upper memory 110, for estimating motion vectors of a current (2w+2)'th macroblock, correspond to those of the hatched blocks.

In exemplary embodiments of the present invention, reducing or minimizing a memory size may be accomplished by overwriting data into a previously used memory field while storing a motion vector in the upper memory. In detail, after estimating a motion vector of a current macroblock, motion vectors of four blocks belonging to the bottom block group of the current macroblock may need to be stored in the memory. That is, the motion vectors of the four blocks belonging to the bottom block group of the current macroblock are overwritten into the memory field that is no longer being further referred for the estimation of motion vector.

Figure 10:
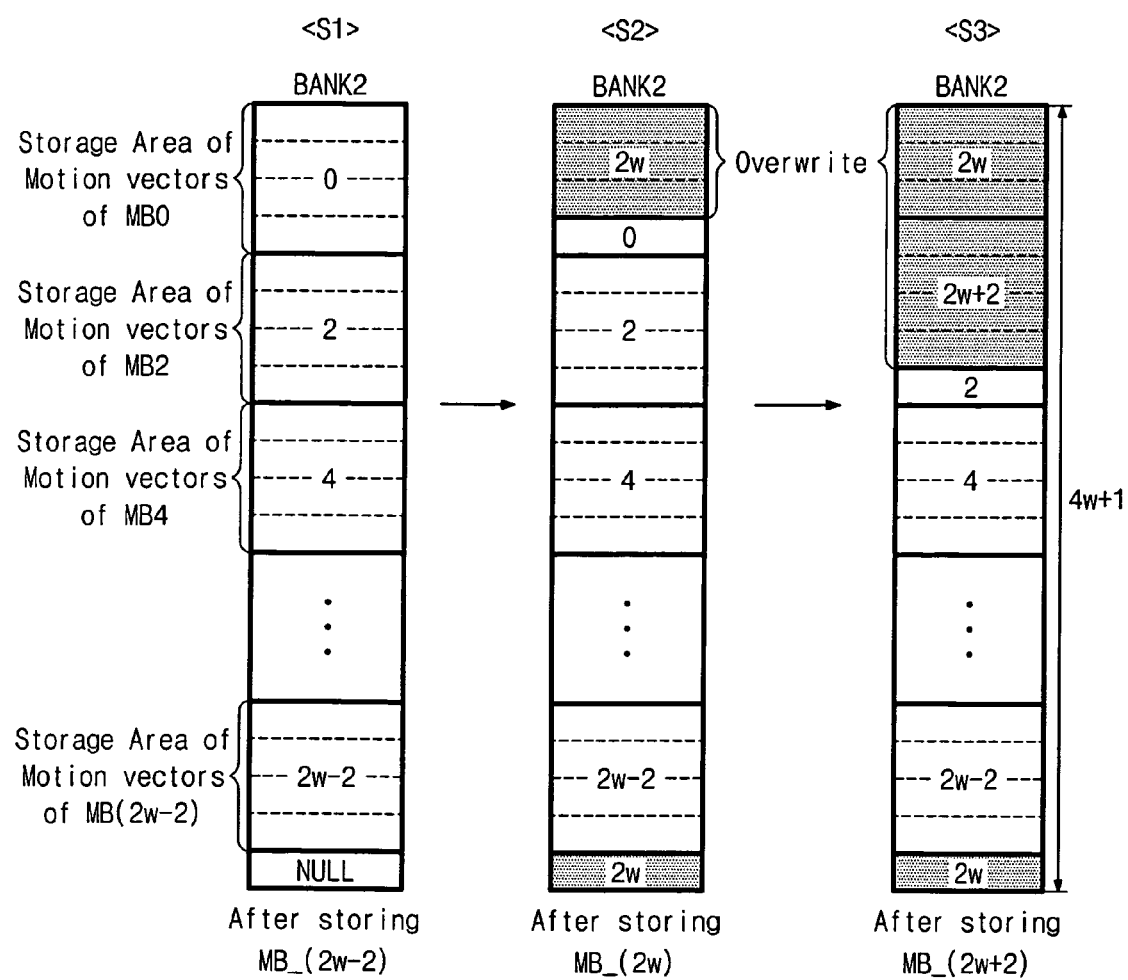
FIG. 10 is a schematic diagram illustrating operations to store motion vectors of a second bank BANK2, in two banks of an upper memory, which stores motion vectors of blocks of the upper macroblock, according to exemplary embodiments of the present invention.

FIG. 10 illustrates operations to store motion vectors of the second bank BANK2, in the two banks of the upper memory, which stores motion vectors of blocks of the upper macroblock.

In FIG. 10, <S1> illustrates operations of storing motion vectors of the 0'th through (2w−2)'th macroblocks shown in FIG. 8A in the second bank BANK2. The motion vectors of the 0'th through (2w−2)'th macroblocks are stored from addresses from 0 to (w−1)*4+3 in sequence. In this state <S1>, the operation of motion-vector estimation is carried out for the 2w'th through (2w+1)'th macroblocks. As aforementioned, blocks of each macroblock stored in the upper memory are corresponding to the four blocks belonging to the bottom block group.

The state <S2> of FIG. 10 illustrates operations of storing motion vectors of four blocks belonging to the bottom block group of the 2w'th macroblock after prosecuting motion vectors of the 2w'th through (2w+1)'th macroblocks. The motion vectors of the four blocks belonging to the bottom block group of the 2w'th macroblock are partially overwritten into a field, which is not further used in the second bank BANK2, partially storing motion vectors of four blocks belonging to the bottom block group of the 0'th macroblock. In other words, a first one among the motion vectors of the four blocks belonging to the bottom block group of the 2w'th macroblock is written in the address (w+4) of the second bank BANK2. And, the remaining three blocks among the four blocks belonging to the bottom block group of the 2w'th macroblock are written in the addresses of the second bank BANK2, from 0 to 2, in sequence.

The state <S3> of FIG. 10 illustrates operations of storing motion vectors of the (2w+2)'th macroblock in the second bank BANK2. As similar to the state <S2>, the four motion vectors of the (2w+2)'th macroblock are overwritten into the addresses from 3 to 6 which become a null space (i.e., a memory field in which the 0'th through second macroblocks are stored) after estimating the motion vector of the (2w+2)'th macroblock. As such, as the motion vectors of the current macroblock are overwritten until estimating the motion vector of the last macroblock, it is sufficient for the upper memory 110 to be sized with 4w+1 in operating the motion-vector estimation.

Figure 11:
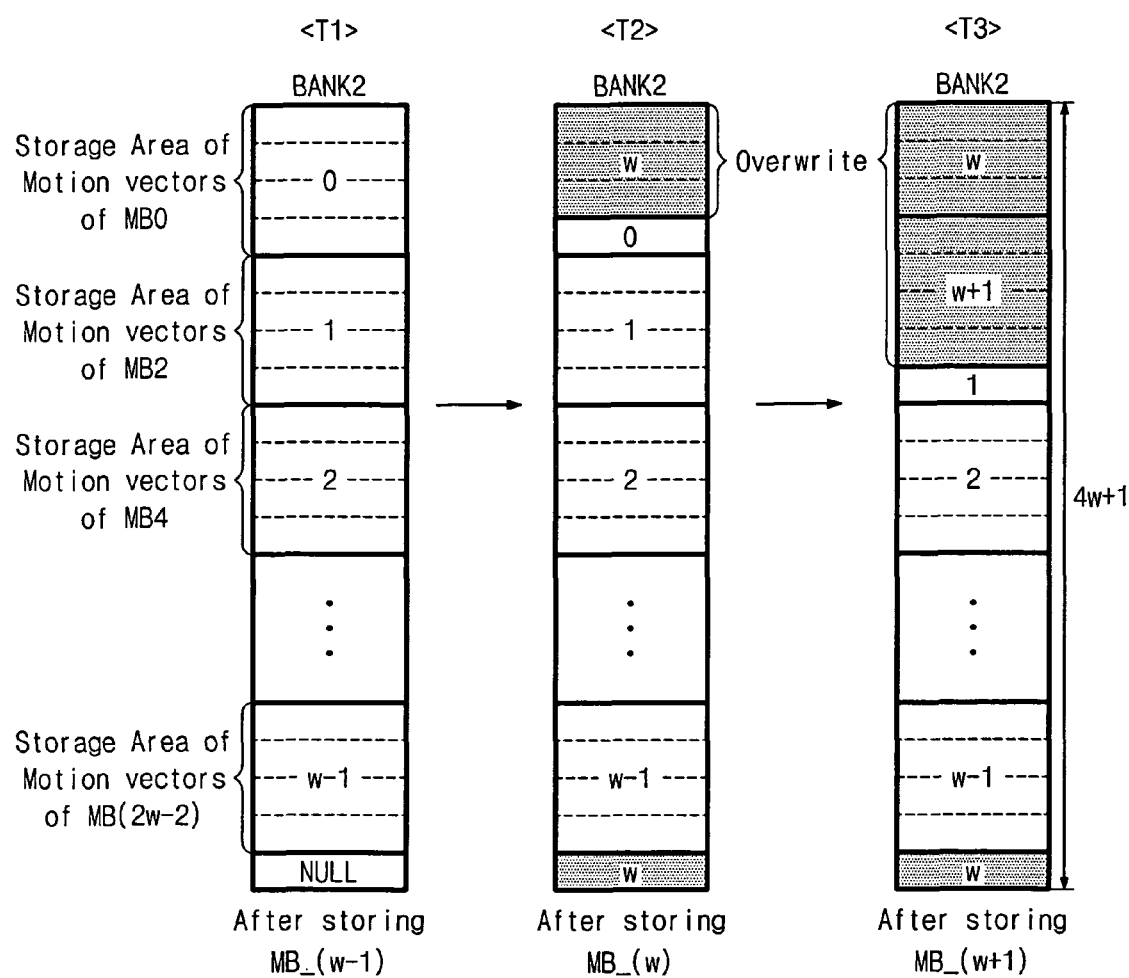
FIG. 11 is a schematic diagram illustrating operations to store motion vectors of the second bank BANK2 in two banks of an upper memory in the normal mode according to exemplary embodiments of the present invention.

FIG. 11 illustrates operations to store motion vectors of the second bank BANK2 in the two banks of the upper memory in the normal mode. Operations of storing motion vectors in the normal mode is similar to that in the MBAFF mode shown in FIG. 10. But, as one super macroblock includes a single macroblock only in the normal mode, the macroblocks are stored in the second bank BANK2 in sequence from the 0'th macroblock.

Figure 12:
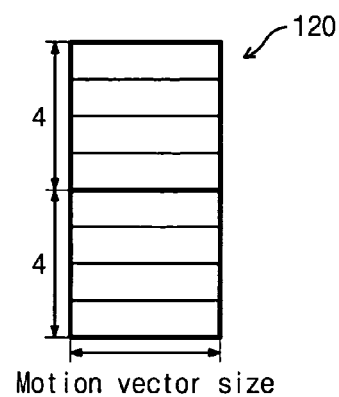
FIG. 12 is a schematic diagram illustrating a structure of a left memory according to exemplary embodiments of the present invention.

A structure of the left memory can be simpler than that of the upper memory. FIG. 12 illustrates a structure of the left memory. Motion vectors to be stored in the left memory may correspond to those of the left block group of macroblocks located at the left side of the current macroblock. While in the normal mode, this memory may just need to store four motion vectors only, the MBAFF mode may need to store four motion vectors from the upper macroblock and four motion vectors from the lower macroblock. Thus, eight motion vectors are all stored in the left memory.

As aforementioned, in order to obtain a motion vector of the current macroblock, as referring to motion vectors of blocks belonging to peripheral macroblocks, the memory may need to store the peripheral motion vectors. Especially, in the MBAFF mode, the number of cases for the peripheral blocks to be referred may increase, which may raise the number of motion vectors to be stored and may complicate selecting conditions for the motion vectors. Therefore, exemplary embodiments of the present invention can provide motion-vector estimation capable of selecting motion vectors of peripheral blocks while reducing or minimizing a memory size.

Figure 13:
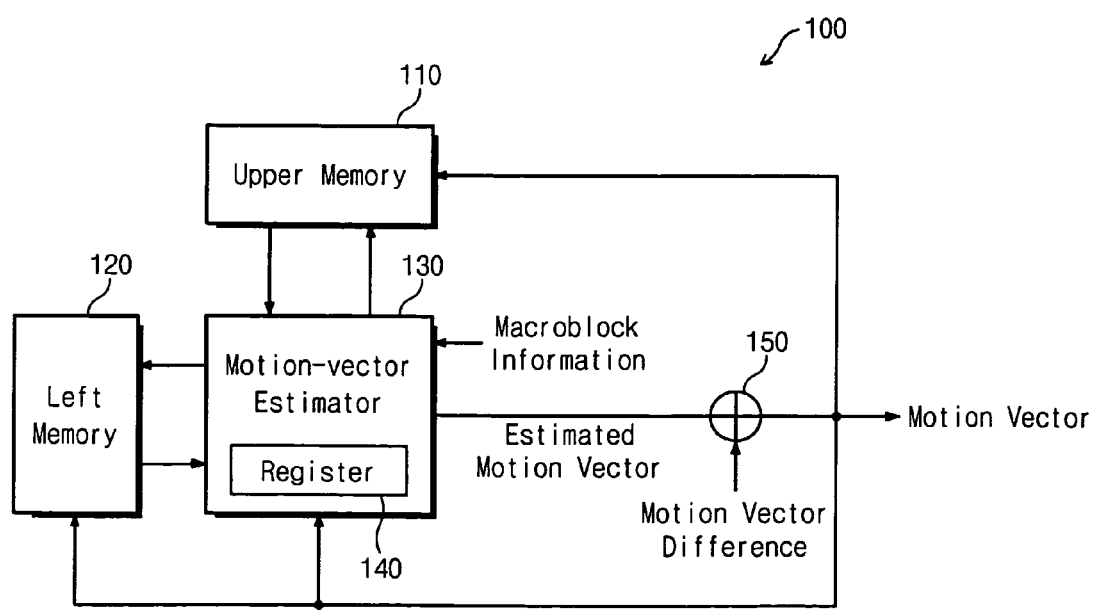
FIG. 13 is a block diagram illustrating a motion-vector estimation device according to exemplary embodiments of the invention.

FIG. 13 illustrates a motion-vector estimation device in accordance with exemplary embodiments of the present invention. The motion-vector operation device 100 is comprised of the upper memory 110, the left memory 120, a motion-vector estimator 130, and an adder 150. The upper and left memories, 110 and 120, may be embodied as static random access memories (SRAMs). However, in other embodiments, other memory types may be used.

The motion-vector estimator 130 includes a register 140 to store motion vectors of the current super macroblock output from the adder 150. The motion-vector estimator 130 generates address signals to access the upper and left memories 110 and 120 on the basis of macroblock information which may be provided from external of the device. The macroblock information generally contains normal/MBAFF-mode information, information about whether coding modes of the current and peripheral macroblock are the frame or field mode, and information about a pixel group size of the current macroblock. The motion vectors stored in the upper and left memories 110 and 120 can be the same as those described before. The motion-vector estimator 130 predicts the motion vector of the current block with reference to motion vectors of blocks included in the current super macroblock stored in the register 140. The adder 180 outputs the motion vector of the current block from adding a difference between an estimated motion vector output from the motion-vector estimator 140 and a motion vector which may be supplied from external of the device.

Figure 6A:
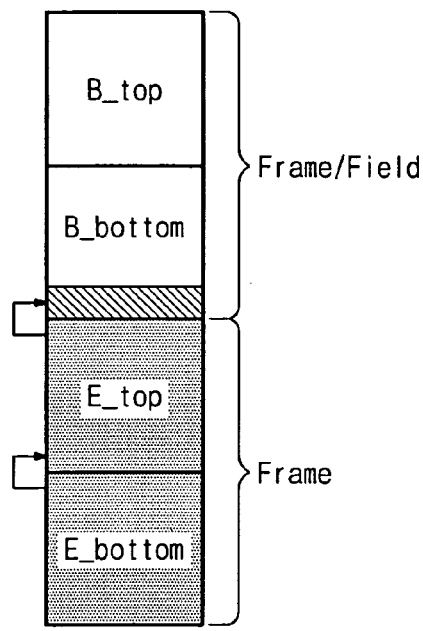
FIGS. 6A through 6C are schematic diagrams illustrating conventional motion vector position of the top block in accordance with coding modes of the current and peripheral macroblocks.
Figure 6B:
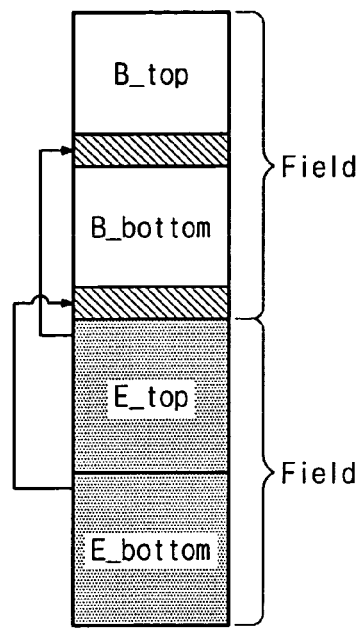
Figure 6C:
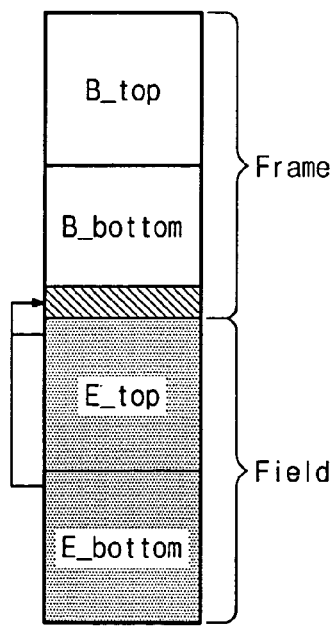

The addresses of the upper memory 110, which are generated from the motion-vector estimator 140, include a bank address, a start address, and an offset address. The bank address is determined in accordance with the frame or field mode of the current and peripheral macroblocks, as illustrated in FIGS. 6A through 6C, generated to select the second bank BANK2 when a block referred in the peripheral super macroblock is positioned within the upper macroblock or to select the first bank BANK1 when a block referred in the peripheral super macroblock is positioned within the lower macroblock.

Figure 14:
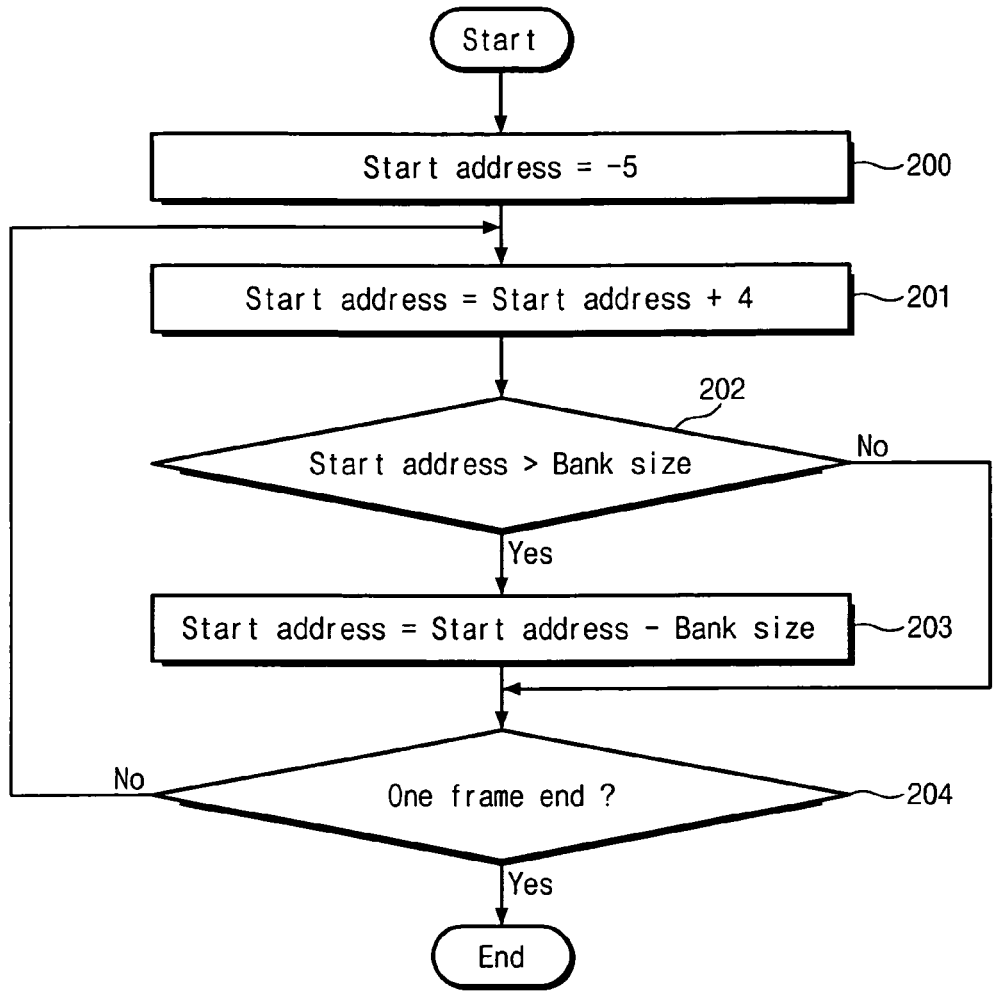
FIG. 14 is a flow chart showing operations of generating a start address changing in the unit of the super macroblock according to exemplary embodiments of the present invention.

The start address is variable in the unit of macroblock. As shown in FIG. 14, the start address (Block 200) increments by 4 (Block 201) that is the number of motion vectors stored per macroblock, being updated to the size of (start address−bank size) (Block 203) when it becomes larger than a bank size (Block 202) until the frame ends (Block 204).

Figure 15A:
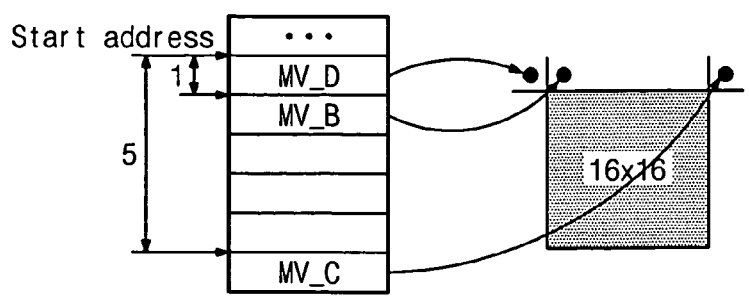
FIGS. 15A through 15C are schematic diagrams illustrating operations of determining an offset address according to exemplary embodiments of the present invention.
Figure 15B:
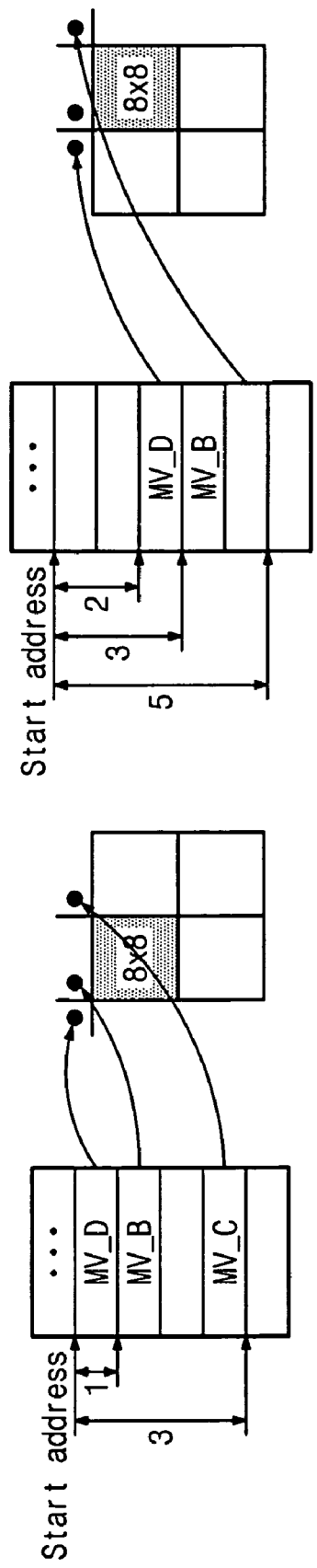
Figure 15C:
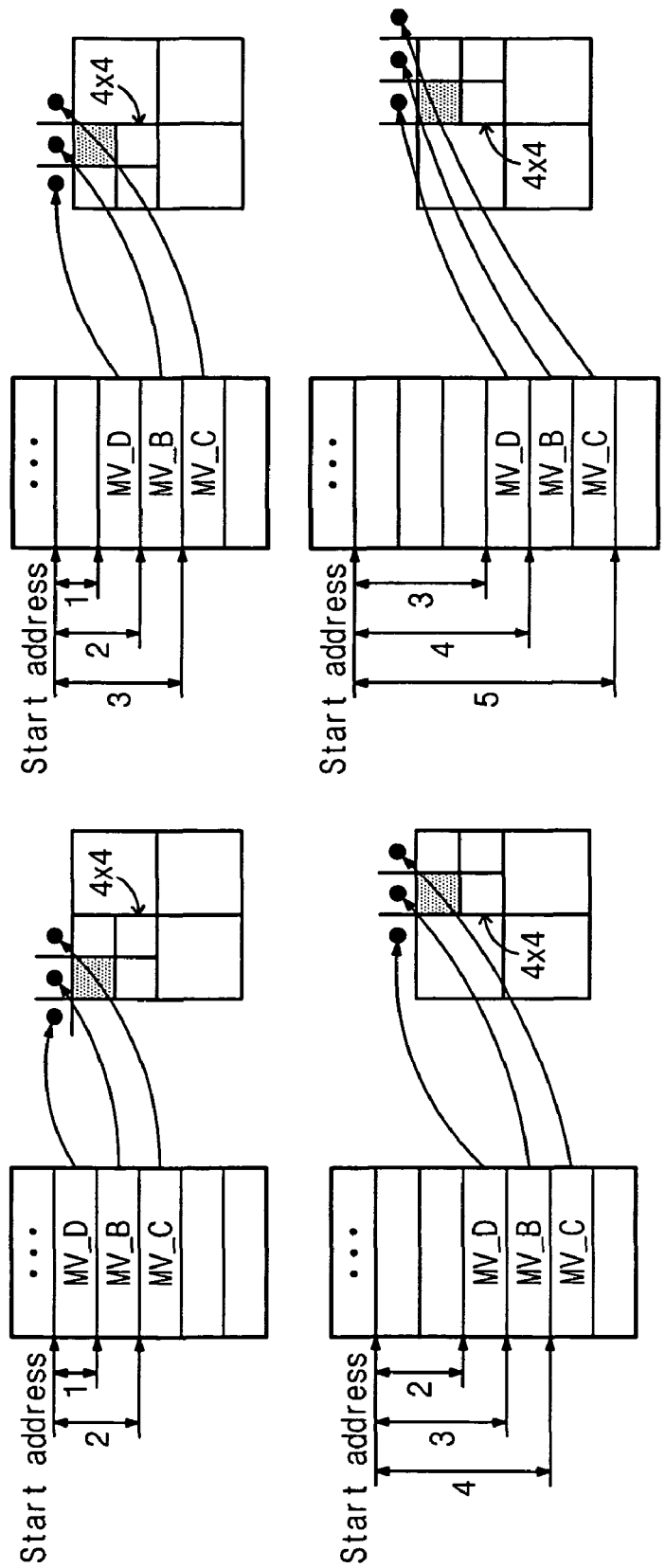

The offset address is determined by the block size, compensating positional distortion of peripheral blocks in accordance with a block composition mode (4×4 or 16×16). FIGS. 15A through 15C illustrate operations for determining the offset address. Referring to FIG. 15A, when blocks of the macroblock are composed in the 16×16 mode, the offset address of the peripheral block D is 0 as same as the start address, the offset address of the peripheral block B is 1, and the offset address of the peripheral block C is 5.

Referring to FIG. 15B, as there are two blocks along the horizontal direction when blocks of the macroblock are composed in the 8×8 mode, the offset address may be calculated twice. The offset address of the peripheral block D around the block B1 is 0 as same as the start address, the offset address of the peripheral block B is 1, and the offset address of the peripheral block C is 3. The offset address of the peripheral block D around the block B2 is 2 different from the start address, the offset address of the peripheral block B is 3, and the offset address of the peripheral block C is 5.

FIG. 15C shows the way of calculating the offset address when blocks of the macroblock are composed in the 4×4 mode. If four blocks are arranged along the horizontal direction in the 4×4 mode, the offset addresses of the peripheral blocks B, C, and D around each of the blocks B3, B4, B5, and B6 are obtained by the same methods as aforementioned.

The final address of the upper memory 120 becomes a sum of the bank address varying every macroblock, the start address, and the offset address varying every block.

As the left memory 120 just stores a motion vector of the left macroblock around the current macroblock, it is able to refer to the left memory 120 without conducting a complicated indexing operation if there is information about the frame or field mode of the current and peripheral macroblocks.

Figure 16A:
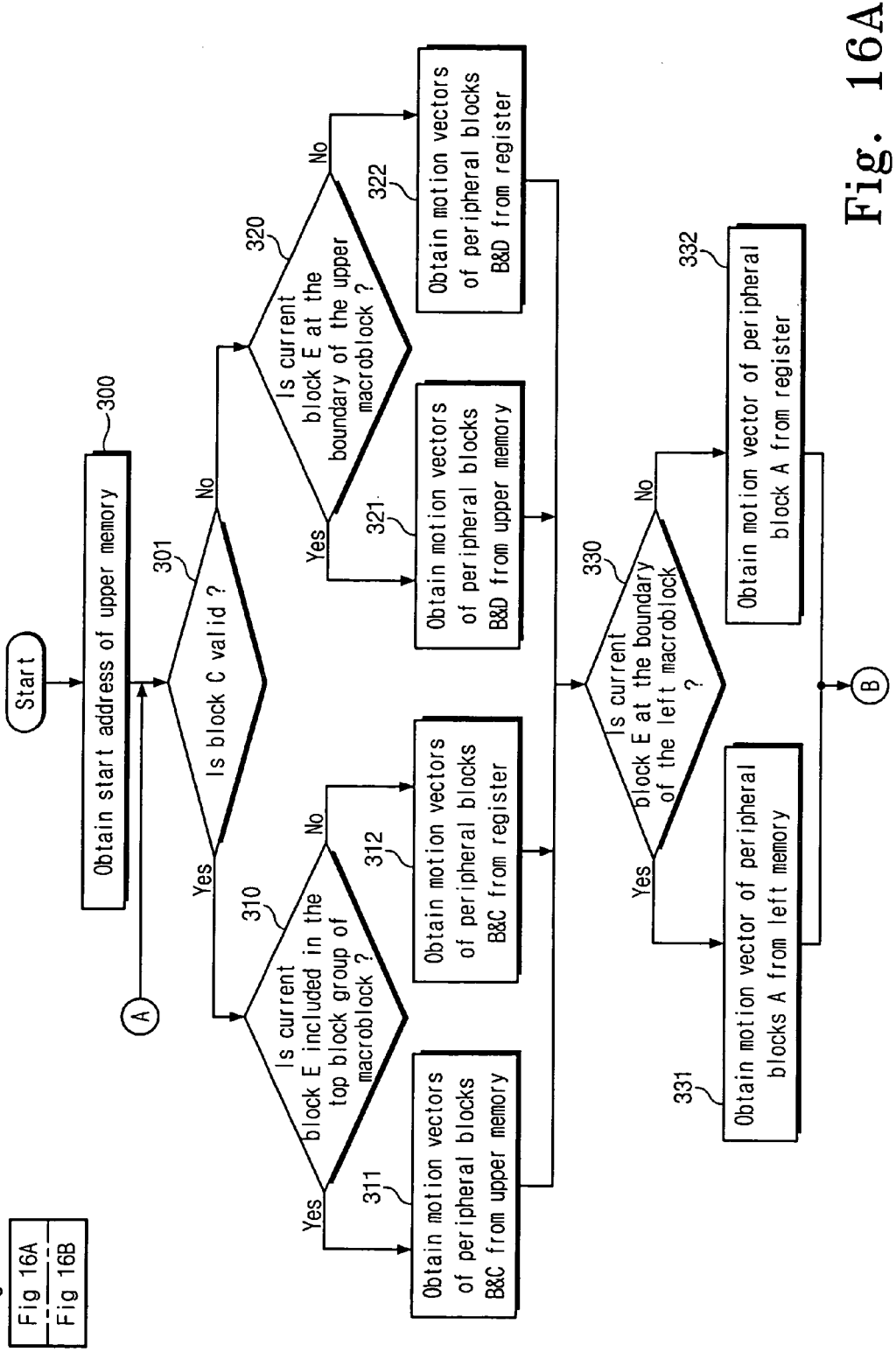
FIGS. 16A and 16B are flow charts showing operations of estimating a motion vector according to exemplary embodiments of the invention.
Figure 16B:
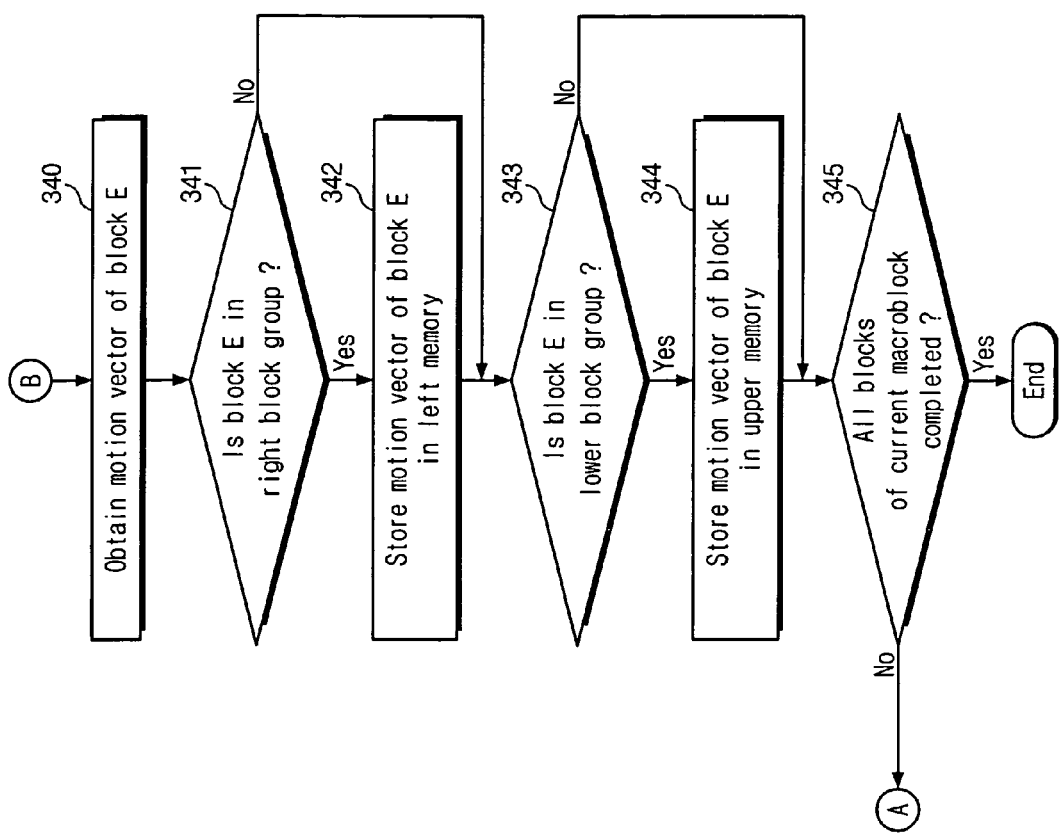

FIGS. 16A and 16B are flow charts showing operations of estimating a motion vector in accordance with exemplary embodiments of the invention.

Figure 2A:
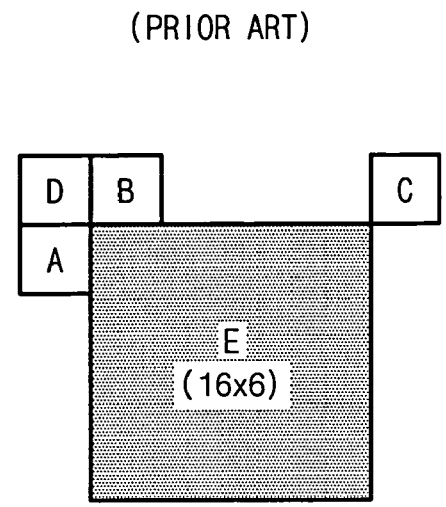
FIGS. 2A through 2C are schematic diagrams illustrating conventional variation in positions in accordance with mode types and positions of the current block.
Figure 2B:
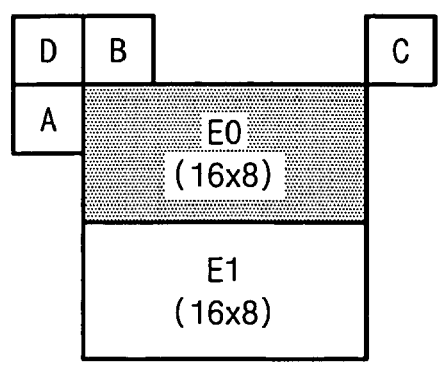
Figure 2C:
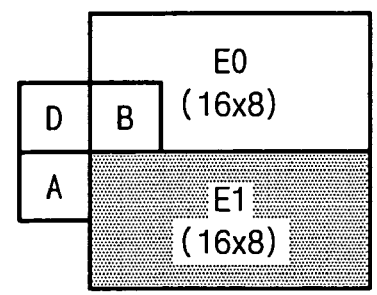
Figure 3A:
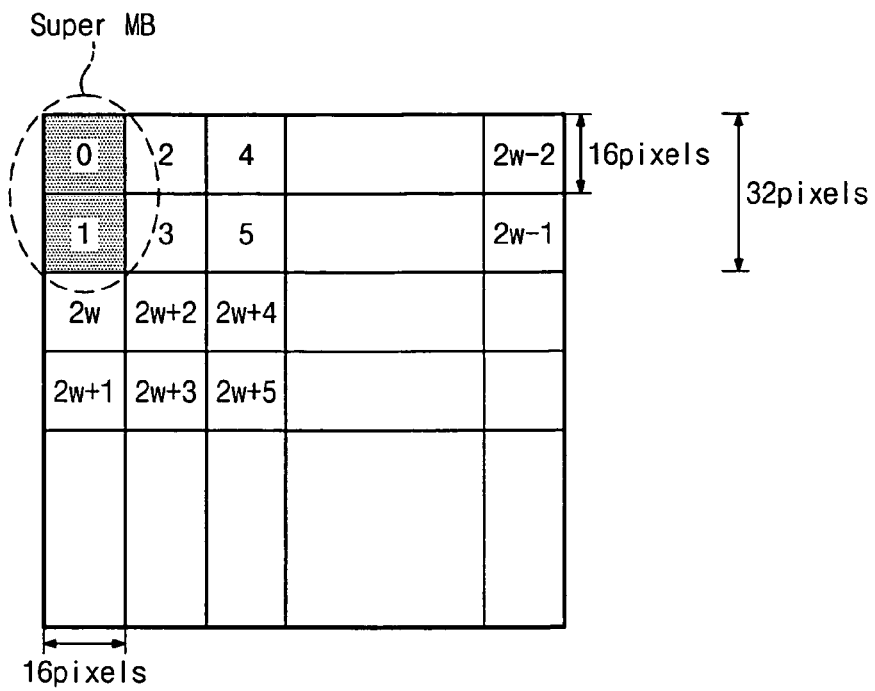
FIG. 3A is a schematic diagram illustrating a conventional example of a MBAFF mode coding a vertical macroblock pair that is referred to as a single super macroblock.
Figure 3B:
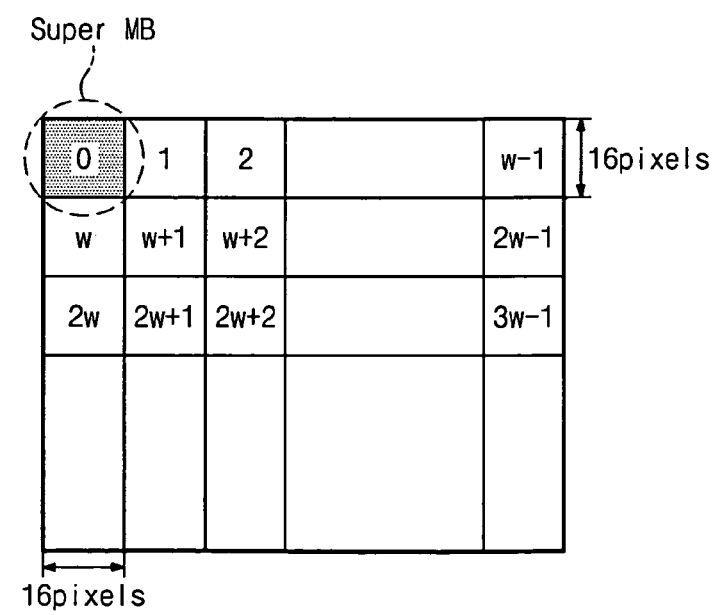
FIG. 3B is a schematic diagram illustrating a conventional super macroblock in a normal mode.
Figure 5A:
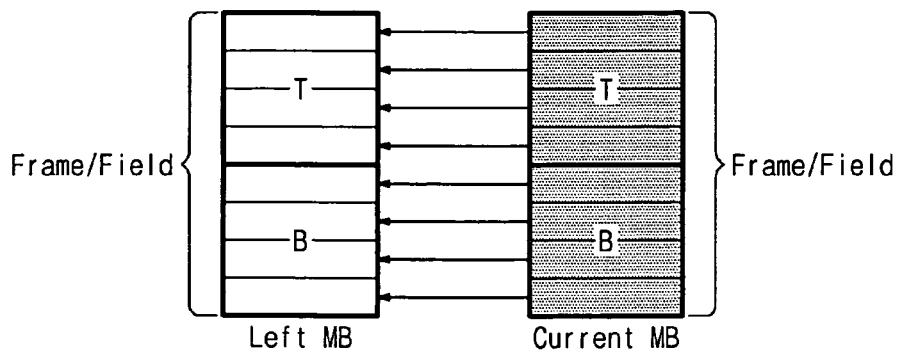
FIGS. 5A through 5C are schematic diagrams illustrating conventional features of the motion vector Mv_A of the left block in accordance with coding modes of the current and peripheral macroblocks.
Figure 5B:
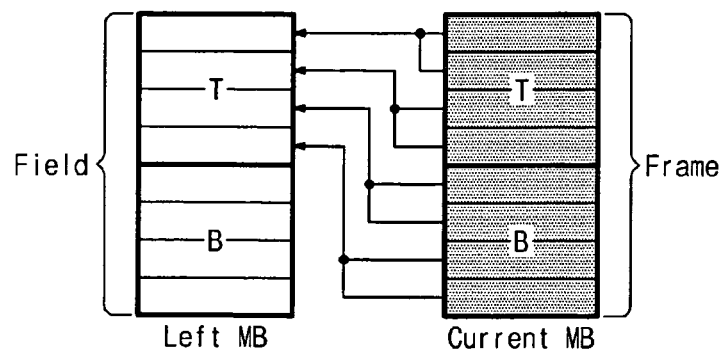
Figure 5C:
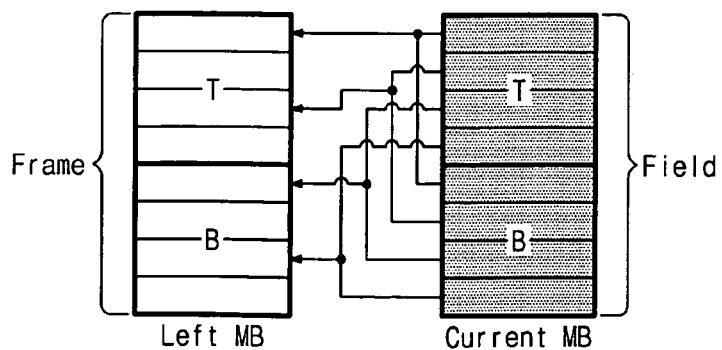

Block 300 calculates the start address of the upper memory 110 and Block 301 determines the validity of the block C. The peripheral block C is used in estimating a motion vector of the current macroblock as shown in FIGS. 2A and 2B, but when the peripheral block C of the block E1 belongs to a macroblock coded after the current macroblock, the block D is used as the peripheral block instead of the block C. After the determination, if the block C is valid, operations proceed to Block 310.

Block 310 determines whether the current block E is included in the top block group of the upper macroblock. Referring to FIG. 7, if the current block E is one among the blocks, E0, E1, and E4, located in the top block group of the upper macroblock, motion vectors of the peripheral blocks B and C are read out from the upper memory 110 and taken into the upper and lower motion vectors, respectively (Block 311). If the current block E is one among the blocks, E2, E3, E6, E8, E9, E12, E10, E11, and E14, located out of the top block group of the upper macroblock, motion vectors of the peripheral blocks B and C are taken into the upper and lower motion vectors, respectively, from the current macroblock E stored in the register 140 (Block 312).

Meantime, after the determination by Block 301, if the block C is invalid, operations proceed to Block 320. Block 320 determines whether the current block E is positioned at the boundary of the upper macroblock. Referring to FIG. 7, if the current block E is the block E5 belonging to the top block group of the upper macroblock, motion vectors of the peripheral blocks B and D are read out from the upper memory 110 and taken into the upper and left-upper motion vectors, respectively (Block 321). If the current block E is one among the blocks, E7, E13, and E15, located out of the top block group of the upper macroblock, motion vectors of the peripheral blocks B and D are taken into the upper and lower motion vectors, respectively, from the current macroblock E stored in the register 140 (Block 322).

Completing one of Blocks 311, 312, 321, or 322, results in the upper motion vector, and the lower motion vector or the left-upper motion vector, for the current macroblock E.

Block 330 determines whether the current block E is included in the left block group. If the current block E is one among the blocks, E0, E1, E8, and E10, located at the boundary of the left macroblock, a motion vector of the peripheral block A is read out from the left memory 120 (Block 331). If the current block E is one among the blocks, E1, E3 E15, located out of the boundary of the left macroblock, the motion vector of the peripheral block A is taken from the current macroblock (Block 332).

Completing Block 331 or Block 332 results in the motion vector of the peripheral block A.

Therefore, by Block 340, an estimated motion vector of the current block E is calculated by means of the motion vectors of the peripheral blocks A, B, and C or D those are preliminary obtained and stored.

Operations of Blocks 301 through 340 may be carried out by the estimated motion-vector detector 140 shown in FIG. 13. The estimated motion vectors output from the estimated motion-vector detector 140 are provided to the upper and left memories 110 and 120 after passing through the adder 150.

Block 341 determines whether the current block E is included in the right block group. Referring to FIG. 7, if the current block E is one among the blocks, E5, E7, E13, and E15, located in the light block group, it is stored in the left memory 120 because it is to be used as the peripheral block B while estimating the motion vector of the next macroblock (Block 342).

Block 343 determines whether the current block E is included in the lower block group. Also referring to FIG. 7, if the current block E is one among the blocks, E10, E11, E14, and E15, belonging to the lower block group, it must be stored in the upper memory 110 because it is to be used as the peripheral blocks B, and C or D while estimating the motion vector of the next macroblock (Block 344).

Block 345 checks whether the procedure of the motion-vector estimation has been completed for all the blocks of the current macroblock. By way of these operations, the motion vectors of blocks belonging to one macroblock are obtained.

As described above, exemplary embodiments of the present invention may be efficient in conducting the motion-vector estimation operable during the procedure of motion compensation even in the MBAFF mode as well as in the normal mode. In particular, the memory storing motion vectors of the peripheral macroblocks may be effectively configured to make its size reduced or minimized. Moreover, it can simplify the procedure of generating memory addresses to index macroblocks for the MBAFF mode, thereby allowing reduced power consumption.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A motion-vector operation device comprising:
   an upper memory comprising first and second banks that are configured to store motion vectors of a lower block group belonging to a macroblock;
   a left memory that is configured to store motion vectors of a right block group belonging to a macroblock; and
   an estimator that is configured to calculate a motion vector of a current block with reference to the motion vectors stored in the first and second banks of the upper memory and the left memory in accordance with an operation mode and a position of the current block in a super macroblock.

2. The motion-vector operation device as set forth in claim 1, which further comprises an adder that is configured to output a motion vector in response to adding a difference between the estimated motion vector and motion vector of the current block.

3. The motion-vector operation device as set forth in claim 2, wherein the estimator comprises a register that is configured to store the motion vector output from the adder for a block of the current super macroblock.

4. The motion-vector operation device as set forth in claim 3, wherein the motion-vector operation device is operable in a macroblock adaptive frame/field mode.

5. The motion-vector operation device as set forth in claim 4, wherein the super macroblock includes first and second macroblocks.

6. The motion-vector operation device as set forth in claim 5, wherein the first and second macroblocks are adjacent to each other along a horizontal direction, forming a macroblock pair.

7. The motion-vector operation device as set forth in claim 6, wherein the estimator is configured to control the motion vector of the adder to be stored in the first bank of the upper memory when the current block belongs to the first macroblock.

8. The motion-vector operation device as set forth in claim 7, wherein the estimator is configured to control the motion vector of the adder to be stored in the second bank of the upper memory when the current block belongs to the second macroblock.

9. The motion-vector operation device as set forth in claim 8, wherein a size of the first and second banks of the upper memory is $(w*a+1)*s$, where w is the number of macroblocks on a horizontal direction in a frame; a is the number of blocks on the horizontal direction in a macroblock; and s is a size of motion vector.

10. The motion-vector operation device as set forth in claim 9, wherein the first bank of the upper memory is configured to store motion vectors from the last block of the bottom block group, belonging to the first macroblock of a left-upper super macroblock around the super macroblock, to the bottom block group belonging to the first macroblock of a left super macroblock around the super macroblock.

11. The motion-vector operation device as set forth in claim 10, wherein the second bank of the upper memory is configured to store motion vectors from the last block of the bottom block group, belonging to the second macroblock of a left-upper super macroblock around the super macroblock, to the bottom block group belonging to the second macroblock of a left super macroblock around the super macroblock.

12. The motion-vector operation device as set forth in claim 11, wherein the left-upper super macroblock is adjacent to the super macroblock left and upwardly.

13. The motion-vector operation device as set forth in claim 12, wherein the left super macroblock is adjacent left to the super macroblock.

14. The motion-vector operation device as set forth in claim 13, wherein the estimator is configured to generate an address containing a start address, a bank address, and an offset address, accessing the upper memory.

15. The motion-vector operation device as set forth in claim 14, wherein the start address increases every super macroblock.

16. The motion-vector operation device as set forth in claim 15, wherein the start address increases by the number of blocks included in the bottom block group of the macroblock.

17. The motion-vector operation device as set forth in claim 16, wherein the start address is re-established in a value of (start address−bank size) when the start address is larger than the bank size.

18. The motion-vector operation device as set forth in claim 17, wherein the bank address is provided to select the first and second banks of the upper memory.

19. The motion-vector operation device as set forth in claim 18, wherein the offset address is established in accordance with a size of the block belonging to the macroblock.

20. The motion-vector operation device as set forth in claim 19, wherein the offset address is established in accordance with a position of a peripheral block.

21. The motion-vector operation device as set forth in claim 20, wherein the address is a sum of the start address, the bank address, and the offset address.

22. The motion-vector operation device as set forth in claim 21, wherein the estimator is configured to control the motion vector of the adder to be stored in a position of the upper memory designated by the address.

23. The motion-vector operation device as set forth in claim 22, wherein the left memory is configured to store motion vectors of the right block group of the left super macroblock around the super macroblock.

24. The motion-vector operation device as set forth in claim 23, wherein the motion-vector operation device is operable in a normal mode.

25. The motion-vector operation device as set forth in claim 24, wherein the super macroblock includes a first macroblock.

26. The motion-vector operation device as set forth in claim 25, wherein the estimator is configured to calculate a motion vector of a current block of the super macroblock with reference to motion vectors stored in the first bank of the upper memory and the left memory and motion vectors of the super macroblock preliminarily obtained.

27. The motion-vector operation device as set forth in claim 26, wherein the estimator controls the motion vector of the adder to be stored in the first bank of the upper memory.

28. A method of operating a motion vector in a device comprising: using a computer to perform the following:
   providing an upper memory including first and second banks, a left memory, and a register that is configured to store a motion vector of a current super macroblock; and
   calculating a motion vector of a current block with reference to motion vectors stored in the first and second banks of the upper memory, the left memory, and the register in accordance with an operation mode and a position of the current block in the current super macroblock.

29. The method as set forth in claim 28, wherein calculating the motion vector comprises:
   estimating a motion vector of the current block with reference to motion vectors stored in the upper and left memories and motion vectors of the super macroblock preliminarily obtained; and
   outputting the motion vector of the current block in response to adding a difference between the estimated motion vector and motion vector of the current block.

30. The method as set forth in claim 28, further comprising:
   storing the motion vector in the first and second banks of the upper memory or the left memory in accordance with the operation mode and the position of the current block in the current super macroblock.

31. The method as set forth in claim 30, wherein the method is operable in a macroblock adaptive frame/field (MBAFF) mode, and wherein the super macroblock includes first and second macroblocks.

32. The method as set forth in claim 31, wherein the first and second macroblocks are adjacent to each other along a horizontal direction, forming a macroblock pair.

33. The method as set forth in claim 32, wherein storing the motion vector comprises:
   storing the calculated motion vector of the current block in the first bank of the upper memory when the current block belongs to the bottom block group of the first macroblock of the super macroblock; and
   storing the calculated motion vector of the current block in the second bank of the upper memory when the current block belongs to the bottom block group of the second macroblock of the super macroblock.

34. The method as set forth in claim 33, wherein storing the motion vector further comprises:
   storing the motion vector of the current block in the left memory when the current block belongs to the left block group of the macroblock.

35. The method as set forth in claim 34, wherein a size of the first and second banks of the upper memory is (w*a+1)*s,
   where w is the number of macroblocks on a horizontal direction in a frame; a is the number of blocks on the horizontal direction in a macroblock; and s is a size of motion vector.

36. The method as set forth in claim 35, which further comprises: generating an address to access the upper memory.

37. The method as set forth in claim 36, wherein the address contains a start address, a bank address, and an offset address.

38. The method as set forth in claim 37, wherein the bank address is provided to select the first and second banks of the upper memory.

39. The method as set forth in claim 38, wherein the start address increases every macroblock.

40. The method as set forth in claim 39, wherein the start address increases by the number of blocks included in the bottom block group of the macroblock.

41. The method as set forth in claim 40, wherein the start address is re-established in a value of (start address−bank size) when the start address is larger than the bank size.

42. The method as set forth in claim 41, wherein the offset address is established in accordance with a size of the block belonging to the macroblock.

43. The method as set forth in claim 42, wherein the address is a sum of the start address, the bank address, and the offset address.

44. The method as set forth in claim 43, wherein estimating the motion vector comprises:
   reading motion vectors of the top and right-upper blocks from the upper memory and taking the read motion vectors as upper and right-upper motion vectors respectively, when the right-upper block of the current block is valid and the current block belongs to the top block group of the first macroblock.

45. The method as set forth in claim 44, wherein estimating the motion vector further comprises:
   reading motion vectors of the top and right-upper blocks from the register and taking the read motion vectors as upper and right-upper motion vectors respectively, when the right-upper block of the current block is valid and the current block belongs to the top block group of the first macroblock.

46. The method as set forth in claim 45, wherein estimating the motion vector further comprises:
   reading motion vectors of the top and left-upper blocks from the upper memory and taking the read motion vectors as upper and left-upper motion vectors respectively, when the right-upper block of the current block is invalid and the current block belongs to the top block group of the first macroblock.

47. The method as set forth in claim 46, wherein estimating the motion vector further comprises:
   reading motion vectors of the top and left-upper blocks from the register and taking the read motion vectors as upper and left-upper motion vectors respectively, when the right-upper block of the current block is invalid and the current block belongs to the top block group of the first macroblock.

48. The method as set forth in claim 47, wherein estimating the motion vector further comprises:
   taking a motion vector of the left block, which is stored in the left memory, as a left motion vector when the current block is positioned at the left boundary of the macroblock.

49. The method as set forth in claim 48, wherein estimating the motion vector further comprises:
   taking a motion vector of the left block of the current super macroblock as the left motion vector when the current block is positioned out of the left boundary of the macroblock.

50. The method as set forth in claim 49, wherein estimating the motion vector further comprises:
   estimating the motion vector of the current block on basis of the upper motion vector, the left- and right upper motion vectors, and the left motion vector.

51. The method as set forth in claim 30, wherein the method is operable in a normal mode.

52. The method as set forth in claim 51, wherein storing the motion vector comprises:

storing the calculated motion vector of the current block in the first bank of the upper memory when the current block belongs to the bottom block group of the macroblock.

53. A computer program product stored on a non-transitory computer-readable medium that is configured to perform the method of claim 28.

* * * * *